Aug. 21, 1923.
O. J. HOWE
SHOE TREE
Filed July 21, 1921
1,465,270
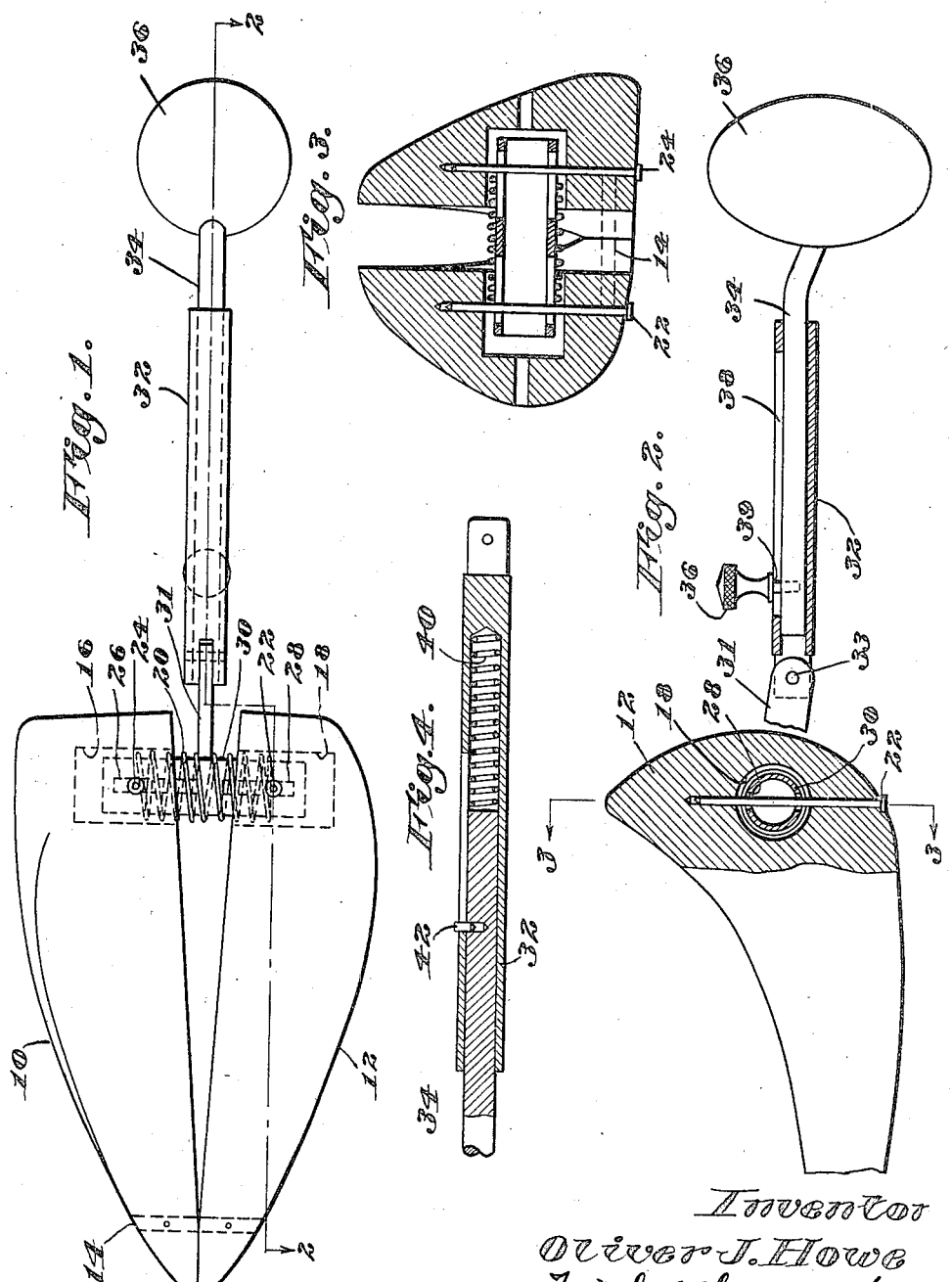
Inventor
Oliver J. Howe
By Mitchell, Chadwick & Kent
Attorneys Patented Aug. 21, 1923.

1,465,270

UNITED STATES PATENT OFFICE.

OLIVER J. HOWE, OF BROCKTON, MASSACHUSETTS, ASSIGNOR TO MAWHINNEY LAST COMPANY, OF BROCKTON, MASSACHUSETTS, A CORPORATION OF MASSACHUSETTS.

SHOE-TREE.

Application filed July 21, 1921. Serial No. 486,418.

*To all whom it may concern:*

Be it known that I, OLIVER J. HOWE, a citizen of the United States, residing at Brockton, in the county of Plymouth and State of Massachusetts, have invented certain new and useful Improvements in Shoe-Trees, of which the following is a specification.

This invention relates to improvements in shoe trees. More especially it relates to trees or forms adapted for insertion in shoes to keep them in proper shape during manufacture, display and in intervals between wearing.

The present invention has among its objects the provision of a simple shoe tree which will maintain a proper gentle outward pressure on the inner surface of the shoe; and which is sufficiently adjustable to be used in different sizes of shoes, varying either in length or in width, or both. These objects are attained by providing a shoe tree having a split fore part whose sections are hinged together near its toe and are acted upon near their rear by a spring extending transversely between them and tending constantly to spread them apart. A heel part is adjustably connected to the fore part by a T-member having a tubular head about which the spring is strung and a mid-leg hinged to the heel portion. Slots formed in the T head receive pins from the sections of the fore part in such manner as to transmit the expansive force of the spring, prevent the sections from spreading too far apart, and so to lock the parts together, and to maintain the heel connection projecting at the predetermined angle. It is intended that the patent shall cover by suitable expression in the appended claims whatever features of patentable novelty exist in the invention disclosed.

In the drawings:

Figure 1 is a bottom plan of a tree constructed in accordance with the present invention;

Figure 2 is a view partly in section on line 2—2 of Figure 1;

Figure 3 is a section through the fore part, as on line 3—3 of Figure 2;

Figure 4 is a section showing a modification of the connecting member.

Referring to the drawings, a fore part is divided substantially along its longitudinal axis into sections 10 and 12 movably connected near their toe ends by an ordinary cord hinge 14, and having near their rear ends opposed apertures 16 and 18 each extending into one of the fore part sections from the cleft between them. In these apertures a spring 20 is held in compression between the sections, extending helically between the cylindrical walls of the aperture and the cylindrical surface of a tube 30, which extends loosely across the cleft from one section to the other, with its ends retained in the apertures by pins 22 and 24, which as illustrated, may be ordinary nails, driven across the aperture from the bottom of the tree through slots 26 and 28 in the said tube 30. These slots are lengthwise of the tube and serve both to permit and to limit the movement of the sections to and from each other. The fit of the spring and tube within the apertures is sufficiently loose to permit free rocking movement of the sections on the forward hinge, yet is sufficiently tight to maintain them substantially in register with each other. At the middle of the tube where it is crossing the cleft, an arm 31 is rigidly connected to it passing out from the tube between the fore part sections toward the rear, forming with the tube, a T shaped member of which the tube 30 constitutes the head and the arm 31 constitutes the leg. The arm 31 has an endwise extension comprising a tube 32 pivoted thereon by a pin 33. Within this tube a plunger 34 may telescope so that a heel part 36, attached to the end of the plunger 34 may be set away from the fore part to a desired extent in order to abut against the inner surface at the rear of a shoe and may be secured by a thumb screw 36 whose shank passes through a slot 38 in the tube, there being a clamping shoulder 39 on the screw.

In Figure 4 a modification of the connecting member is shown wherein a spring 40 is placed within the sleeve 32 so as yieldingly to force the plunger and heel part rearward, with travel limited by a pin 42 projecting from the plunger within the slot 38, until the heel part 36 presses against the wall of the shoe.

When being placed in the shoe the heel part is swung upward about the pivot 33, and the fore part of the tree pushed bodily into the fore part of the shoe. This causes the portions 10 and 12 to contract together at their rear, swinging about the cord hinge at the toe as a pivot and compressing the spring 20 between them. When the tree has thus been pushed as far forward into the shoe as is possible, the heel part is swung down into the shoe until the part 36 presses against the inner rear wall of the shoe. If the connecting member shown in Figure 2 is used, the length to which the heel part must extend to provide a close fitting engagement with the shoe may be first estimated, and the plunger then locked in position with respect to the sleeve by the thumb screw 36. This may apply any desired degree of further stretch fore and aft. If the spring connecting member shown in Figure 4 is used, the heel part 36 will adjust itself firmly against the shoe applying the pressure of the spring to stretch the shoe. It is obvious that when thus placed in the shoe the fore part of the tree will constantly tend to spread laterally under the influence of the transverse spring 20, thereby exerting constant pressure sidewise on the upper of the shoe and both the fore part and the heel part will exert pressure lengthwise, due either to the longitudinally acting spring 40, or the tight fit of the tree when forced in. The constant and gentle pressure will tend to maintain the shoe in proper shape.

I claim:

1. A shoe tree comprising a fore part, having longitudinal sections connected at their toe ends by a hinge whose parts are secured to said sections and to each other and thereby prevent the spreading of the said sections at the toe; combined with a spring spreader arranged between the rear ends of said sections and tending constantly to spread them; a heel part; and a T-shaped connecting element whose head portion is a cross rod which loosely engages said sections of the fore part and holds said spreader in place between them, and whose leg portion connects the heel part therewith.

2. A shoe tree comprising a forepart having sections hinged together near their toe ends and having a spring at their rear ends tending to swing them apart laterally about the toe hinge; a heel part; and means connecting the two foreparts and the heel part together and adapted to limit said swing.

3. A shoe tree comprising a forepart divided longitudinally into sections, having a hinge near the toe end and having a coiled spring interposed between the sections near their rear, yieldingly to expand the sections laterally, the said spring having its ends housed in sockets in the forepart sections; a heel part; and means connecting said heel part and forepart comprising a rod with ends in said sockets, about which the said spring is coiled; there being slots in said rod adapted to coact with pins penetrating them from the sections to permit and to limit the expanding movement of the sections.

4. A shoe tree comprising a forepart having sections hinged near their forward ends; a coiled spring near their rear ends partly housed in a socket in each section, adapted to exert constant pressure tending to move said sections apart; a heel part at a distance from the forepart and having a connecting member pivoted on an axis to the rear of said forepart; and joining means comprising a non-rotatable tubular member floating laterally in said sockets and having an arm extending rearward and pivoted to said heel connecting member.

5. A shoe tree comprising a fore part having longitudinal sections, a heel part, and a connecting element having a leg and a cross head; the said connecting element having its cross head engaging the sections of the fore part so as to hold them together; there being on it an elastic spreading device tending constantly to separate the forepart sections toward a predetermined limit; and the leg thereof being connected to the heel portion.

6. A shoe tree comprising in combination a forepart divided longitudinally into sections hinged together near their toe ends, and having near their rear ends a socket in each section extending transversely to their plane of cleavage; a spring interposed between said sections lying partly within each socket; a tubular member lying within said spring, extending into said apertures, and having slots in its shell parallel to its axis; a pin in each section passing through the socket thereof and through one of said slots, said pins constituting abutments for the ends of said spring; an arm on said member projecting rearward between convolutions of the spring and between the sections of the fore part; a connecting member pivoted on said arm at the rear of said forepart, so as to swing in the plane of cleavage of the forepart sections; and a heel part adjustably secured to said connecting member.

7. A shoe tree comprising a forepart having sections hinged near their forward ends; a coiled spring near their rear ends partly housed in a socket in each section, adapted to exert constant pressure tending to move said sections apart; a heel part at a distance from the forepart and having a connecting member pivoted on an axis to the rear of said forepart; and joining means comprising a T-member with the ends of its head extending non-rotatably into the forepart sockets, and with the leg of the T having pivotal connection with the connecting member of the heel part.

Signed at Brockton, Massachusetts, this eighth day of July 1921.

OLIVER J. HOWE.